（12) United States Patent
Lutz et al.

(10) Patent No.: US 9,239,852 B1
(45) Date of Patent: Jan. 19, 2016

(54) ITEM COLLECTIONS

(71) Applicant: Amazon Technologies, Inc., Reno, NV (US)

(72) Inventors: David Alan Lutz, Renton, WA (US);
Xianglong Huang, Bellevue, WA (US);
Wei Xiao, Kirkland, WA (US); Stefano Stefani, Issaquah, WA (US); Timothy Andrew Rath, Seattle, WA (US);
Somasundaram Perianayagam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 13/802,069

(22) Filed: Mar. 13, 2013

(51) Int. Cl.
*G06F 7/00* (2006.01)
*G06F 17/30* (2006.01)

(52) U.S. Cl.
CPC .............................. *G06F 17/30289* (2013.01)

(58) Field of Classification Search
CPC ... G06F 17/30575; G06F 21/00; G06F 21/10; G06F 21/31; G06F 21/33; G06F 21/86
USPC ......................................................... 707/800
See application file for complete search history.

(56) References Cited

U.S. PATENT DOCUMENTS

2012/0209808 A1* 8/2012 Tien et al. ..................... 707/622

* cited by examiner

*Primary Examiner* — Truong Vo
(74) *Attorney, Agent, or Firm* — Baker & Hostetler LLP

(57) ABSTRACT

A distributed database management system comprising a plurality of computing nodes may distribute data evenly across all nodes. A definition of a primary key that divides the primary key into at least a first key portion and a second key portion may be utilized to locate items related by a first key portion to a specific computing node. Application-consistent queries, local transactions and pivoting operations may be performed on items related by a first key portion.

24 Claims, 8 Drawing Sheets

ITEM COLLECTIONS

BACKGROUND

Various database management systems organize data around collections of key-value data. Within each collection, a unique key value maps to a set of related values. Together, each unique key value and its related values may be described as an item, and the entire collection of items referred to as a table. Although traditional relational database management systems may require each row in the table to adhere to a well-defined schema, key-value database management systems may require little if any schema except a definition of a primary key.

Key-value database management systems may be well-suited to large-scale applications in areas such as e-commerce, web services and cloud computing, which tend to be characterized by having high data volume and throughput demands. These systems may support large datasets and high throughput by distributing data storage and workload among multiple computing systems, virtual machines and other computing instances. These may be referred to as computing nodes. Compared to using larger and more expensive servers, employing a greater number of smaller and less expensive computing nodes may provide for reduced cost, improved resiliency and greater scalability. However, this approach may suffer from various drawbacks including greater system complexity, poor query performance, limited transaction support and so forth.

One approach to data management in distributed key-value database management systems involves distributing data between the nodes that comprise the system as evenly as possibly. This may be beneficial because requests to store and retrieve data will, at least theoretically, be evenly distributed across a given tables key space. If so, the various computing nodes will share equally in the workload and no particular node will be overloaded compared to the rest of the system. However, there are various operations and features that may become difficult, impracticable or impossible when data is distributed this way.

BRIEF DESCRIPTION OF DRAWINGS

The drawings provided herein are intended to illustrate example embodiments and are not intended to limit the scope of the disclosure.

DETAILED DESCRIPTION

Figure 1:
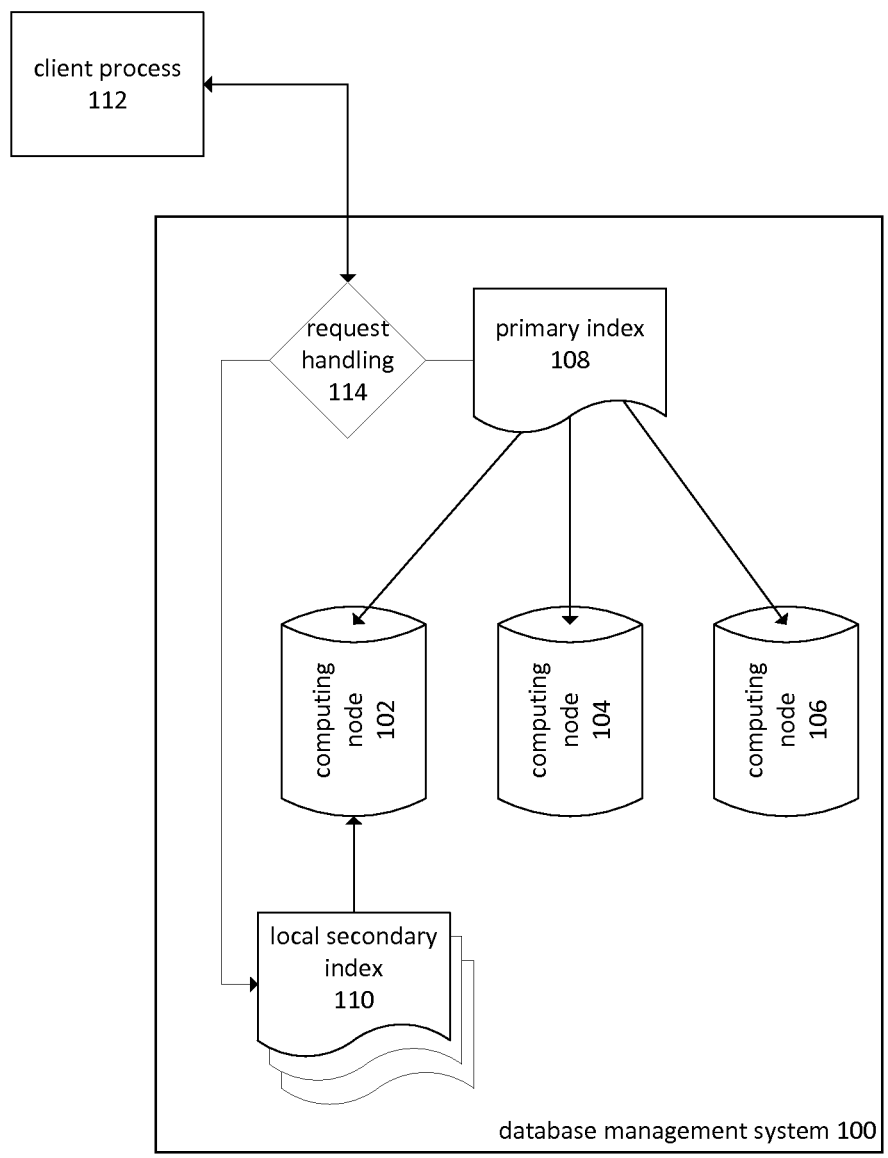
FIG. 1 depicts an embodiment of a database management system with local secondary indexes.

A key-value database management system may be described as having a collection of tables. Each table contains a set of items, the items each comprising a set of values. Each table may have a primary index through which items can be stored and retrieved using a primary key value. All items in a table are accessible through the primary index, and accordingly each item is associated with a primary key.

The set of possible primary key values may be defined as a key space. Because each item must be associated with a primary key, the maximum number of items that may be stored in a table is limited by the size of the primary key. A table with a primary key defined as an 8-bit value could therefore store a maximum of 256 items.

Key-value database management systems may employ various schemes to distribute data across the computing nodes that comprise the system. As noted, it may be advantageous to distribute data as evenly as possible across the nodes in order to distribute storage consumption and workload. It may be preferable to arrange data according to the expected distribution of primary key values in requests to retrieve or store data. On the other hand, as described herein there may also be advantages to unevenly distributing the data based on a subdivision of the primary key into two or more portions.

When data is clustered around one particular node, a majority of the storage and workload demands will be directed to that particular node and performance will suffer. The database management system may therefore attempt to evenly distribute data across the nodes comprising the database management system. However, the distribution of data across multiple nodes also has various disadvantages. Because primary and secondary indexes may have components located on other nodes in the system, there may be a delay in propagating any updates to the indexes. Various queries, particularly those involving pivoting, summarization and so forth, may perform slowly because the relevant data must be assembled from the various nodes in the system. In addition, operations involving multiple items generally cannot be wrapped in an atomic transaction without the involvement of a distributed transaction manager.

Data may be retrieved from the key-value database management system by making a read request specifying a primary key. To perform the retrieval, the system may use various means to locate the item corresponding to the primary key. In some embodiments, the primary index may comprise a distributed hash table, in which a plurality of node structures may each comprise a hash table and a set of links to other node structures. Retrieving data through the distributed hash table may therefore comprise traversing a topology of node structures in order to find an entry matching the key in one of the hash tables. Other embodiments may use a single hash table, linked list, graph or other structure hosted on a designated computing system or on multiple computing systems. In some embodiments, the primary index may be replicated. In some embodiments, a hash function might be applied to the primary key value to determine a value that can be mapped to a specific node on which the data resides. The embodiment might also employ further structures or algorithms for precisely locating the item corresponding to the key.

The database management system may also comprise one or more secondary indexes involving a subset of the data referenced by the primary index. The secondary indexes also involve key-value pairings, but may use different data as keys. For example, a primary index might utilize customer identifiers as keys, while a secondary index might utilize the customer zip codes as keys. In some embodiments a secondary index is implemented using structures and methods similar to those described above regarding primary indexes. Conventional secondary indexes, as opposed to local secondary indexes as described herein, may also refer to data maintained on any of the nodes. While the primary index may be configured to require that each entry be distinct, or in other words, contain a primary key value not replicated elsewhere in the primary index. However, it may be advantageous to configure secondary indexes to allow duplicative entries.

Conventional secondary indexes of the type just described have at least two notable features. First, they require a column definition and thus impose at least some requirement of uniform structure between items. Second, the items referenced by a secondary index are likely to be distributed somewhat evenly across the various computing nodes that comprise the system. This may be advantageous, because the workload generated by querying the secondary index would also be distributed somewhat evenly.

In an embodiment of the present disclosure, the primary key value is defined to have at least a first key portion and a second key portion. One non-limiting example involves specifying a leading segment of the first key, defined in terms of a number of bits, as the first key portion, and the remainder as the second key portion. In some embodiments, the key segments may be overlapped in some way, obfuscated or encrypted.

The database customer, which may for example include a programmer, database designer or analyst, may provide information defining the division of the key into at least a first and second key portion. In other embodiments, the information may be determined by an automated analysis of a sample or actual data set. Once received by the database management system, the information describing the key portions may be retained in a record that is part of the schema definitions corresponding to a table or item collection.

In an embodiment, the first key portion identifies a local item collection, such that all keys with identical first key portion values are placed in the same local item collection. The size and contents of the first and second key portions may be determined with respect to various factors. Because definition of the first and second key portions represents a division of the key space, the size of the second key portion determines the maximum number of items that may be contained in a local item collection. Similarly, the size of the first key portion determines the total number of local item collections that may be defined within the key space. For example, if an 8-bit key space is defined and the leading 2 bits are allocated to the first key portion, the key space will support only 4 local item collections within the key space. If 3 bits are allocated, there may be 8 local item collections within the same key space.

A local item collection is defined as a group of items generally guaranteed by the database management system to be stored on a single computing node. The database management system may act to ensure that all or at least substantially all items belonging to the local item collection are stored on a particular computing node. In some cases, the storage capacity of the computing device, or more generally the computing node, may be exceeded, requiring spill-over to other computing nodes. In such cases, substantially all of the items may still be located on a single computing node. Other embodiments may strictly enforce the single computing node guarantee, for example by returning an error when an attempt is made to store an item that would result in storage capacity being exceeded.

A local item collection may be defined by a user of the database management system. In an embodiment, definition of a local item collection may require specification of the primary key and an identification of the division of the primary key into at least a first key portion and a second key portion. The local item collection may be intended to store items that are logically related. For example, a first key portion might be defined as having a bit length sufficiently wide to accommodate a binary representation of a date. Sales data for a particular date value might correspond to a local item collection and be stored exclusively on a single computing node. However, some embodiments may allow for a minority of items to be stored on other computing nodes, possibly as a stop-gap measure until sufficient space can be allocated on the computing node primarily responsible for maintaining the collection.

A local secondary index is defined as an index that maps exclusively from keys to values maintained on a single computing node. A local secondary index may be constructed on a one-for-one basis with item collections, so that every entry in the index corresponds to an item in the same local item collection, and the index contains references to each item in the collection. In embodiments that support the spill-over scenario described previously, the local secondary index could directly refer to items stored on the same computing node and contain links to a local secondary index on the spill-over machine.

Like a conventional secondary index, a local secondary index may be configured to allow duplicative entries. In other words, the index may contain multiple keys with the same value, each of which may refer to a different item. While the entirety of a single primary key must be unique and the first key portion may be used to uniquely identify an item collection, the second key portion and various subdivisions thereof do not necessarily need to identify a unique value. For example, a primary key consisting of an order ID, a customer ID and various other fields might be divided into a first key portion containing the order ID, and a second key portion containing at least the customer ID. A local secondary index constructed over the customer ID might refer to numerous different orders, each having the same customer ID.

The use of local item collections may have a negative effect on performance because of the potential for uneven distribution of data onto a single computing node. Storage capacity may be exceeded if the total number of items in a single local item collection grows too large. In addition, workload demands may exceed the throughput capacity of the computing node if requests are concentrated on a particular local item collection. Despite these drawbacks, the use of local item collections may provide a number of advantages, particularly when logically related items are maintained on the same computing node. In some embodiments, the first key portion is indicative of a collection of logically related items. In this manner, operations such as atomic multiple-item updates and pivoting may be performed on logically related items sharing a common first key portion. In addition, the local secondary index may be made immediately consistent following an update of logically related items identified by a common first key portion.

An embodiment of the invention may incorporate a local item collection and one or more local secondary indexes, as described above. FIG. 1 depicts an embodiment of a database management system with local secondary indexes. Database management system 100 comprises a plurality of computing nodes 102, 104 and 106. A computing node may comprise various virtual and physical computing devices, computing clusters, virtual machines, virtual machine instances and so forth. The computing nodes collectively manage and store at least one table comprising a collection of items mapped by a primary key.

A primary index 108 maintains references from primary key values to items on all of the computing nodes. As described herein, the database management system may attempt to distribute items evenly across the computing nodes. In practice, some degree of unevenness may result due to the addition and removal of data. Furthermore certain practices disclosed herein may result in uneven data distributions.

Local secondary index 110 maintains references from key values to items located on the computing node 102 but not to items maintained on any other computing node. Furthermore, local secondary index 110 may be associated on a one-to-one basis with a local item collection. The local item collection corresponds to a specific value of a first key portion. Computing node 102 may house any number of item collections. Accordingly, in addition to local secondary index 110 the system may comprise further local secondary indexes, each of which may refer to a separate item collection housed on computing node 102. Although FIG. 1 only depicts local secondary indexes referring to computing node 102, computing nodes 104 and 106 may be similarly configured to store local item collections, each of which may have a corresponding local secondary index.

Client process 112 may issue various requests directed to database management system 100. Client process 112 may take a wide variety of forms, such as components of a multi-tier application, business object, web site, web service and so forth. More generally, client process 112 may be any executable code capable of interacting with database management system 100.

Request handling 114 may be done by distinct or integrated code, processes or components that perform functions involving satisfying requests issued by client process 112. In some embodiments, workload related to request handling 114 is distributed across the computing nodes. The incoming requests comprise an identifying primary key and an indication of the request type, and may further comprise additional information for processing the request such as a new values, updated values, query descriptions and so forth. Request types may include functions such as puts, gets, inserts, update, deletes and so forth.

A first key portion may be extracted from a key value contained in a request issued by client process 112. The first key portion may be examined to determine one or more of the associated restricted item collection, computing system and local secondary index. For requests applicable to previously stored data, the secondary index may be used to map from the key to the location of the item on the computing system associated with the local secondary index. For requests applicable to an item not yet maintained by the database management system, the item may be stored on the associated computing node and the primary and local secondary indexes updated.

Figure 2:
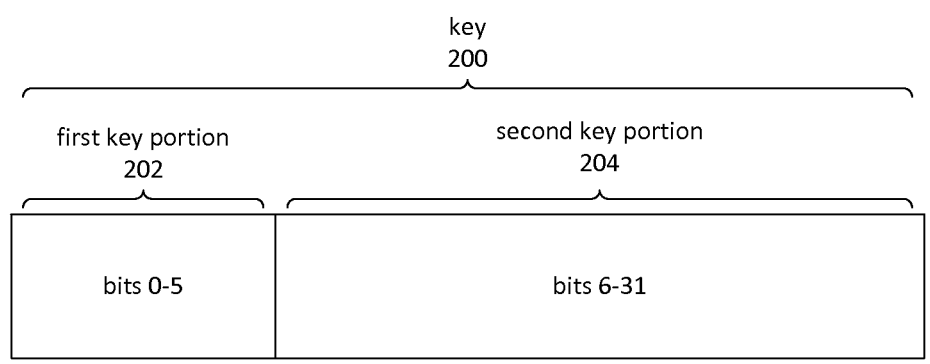
FIG. 2 depicts an embodiment of an apportioned key.

An example of a first key portion key may be seen in FIG. 2, which depicts an embodiment of an apportioned key consistent with aspects of the present disclosure. In the depicted embodiment, key 200 consists of a 32-bit value for which bits 0-5 are associated with the first key portion 202, and bits 6-31 are associated with a second key portion 204. Many other arrangements are possible. It may be preferable to allow the database customer to define the allocation between the first key portion and the second key portion. This may be done, for example, by specifying an option to a web service or application programming interface which may be used to define the table initially.

The first key portion may be allocated sufficient space to represent all possible or likely distinct local item collections. For example, a database designer might desire to have one local item collection per each set of customer orders, so that any one customer's orders would reside in the same collection. The database designer might therefore allocate enough space in the first key portion to represent all possible customer IDs, and sufficient space in the second key portion to represent all order IDs.

In addition to the question of how much space should be allocated for the first key portion, the contents of the first key portion may also be considered. It may be advantageous to use values that naturally identify a related group of data. For the purpose of defining the value of a first key portion, the following factors may be among those considered. The first category is data that is likely to be involved in the same atomic transaction. The second category involves data that would benefit from greater application consistency, such as data being concurrently accessed by multiple applications, or data being updated and queried in succession. Finally, data that may be the subject of various pivoting operations, such as averages and summations, may be considered related for the purposes of defining the value of a first key portion.

In some embodiments, key length is not restricted and may even be variable on a per-key basis. The first key portion may still be delineated, however, using a variety of means. A number of approaches are possible, include the following. First, the leading or trailing edge of the key may be defined as fixed width, even if the overall key length is variable. Second, a delimiter might be defined to indicate the boundary between the first and second key portions. For example, a dash character might be placed between a customer ID and order ID in each key, allowing either portion to be of variable length. In such a case any one of the delimited regions could be designated as the first key region. In other embodiments, the first key region may be an arbitrary region or even comprised of disjoint regions of the key. The first key region might also be extracted from the key by a decryption or deobfuscation function.

In an embodiment, a request may indicate a primary key whose first key portion is associated with an existing collection. If so, the request may be directed to the computing node already associated with that collection. If the first key portion is not associated with an existing collection, a new collection may be created. This may involve storing an association between the first key portion and a particular computing node, or in some embodiments a particular storage device associated with a computing node. The association may be made based on a number of factors including an even distribution of items across a plurality of nodes.

Second key portion 204 may also be further subdivided. One non-limiting example involves partitioning the primary key such that the customer ID is contained within the first key portion. In this example, the second key portion may be further subdivided: one division corresponding to an order ID and the other corresponding to an item ID. Additional local secondary indexes may be constructed using subdivisions of the second key portion. Continuing with the example, a local secondary index might be created over the order ID field. Because specification of the first key portion is associated with collocation on the same computing node, an index created over all or part of the remaining portion of the key will also refer to items only on the same computing node.

In some embodiments, the primary key may be considered to be a distinct value that is separate from the values that comprise the item associated with the primary key. In other embodiments, some or all of the primary key may be made up of values that comprise the associated item. For example, an item might consist of an order ID, a customer ID, an order date and a customer address. The primary key might be composed of the order ID, customer ID and order date. The first key portion might be defined as the order ID, while additional second key portions could comprise the customer ID and order date, either alone or combined together.

Figure 3:
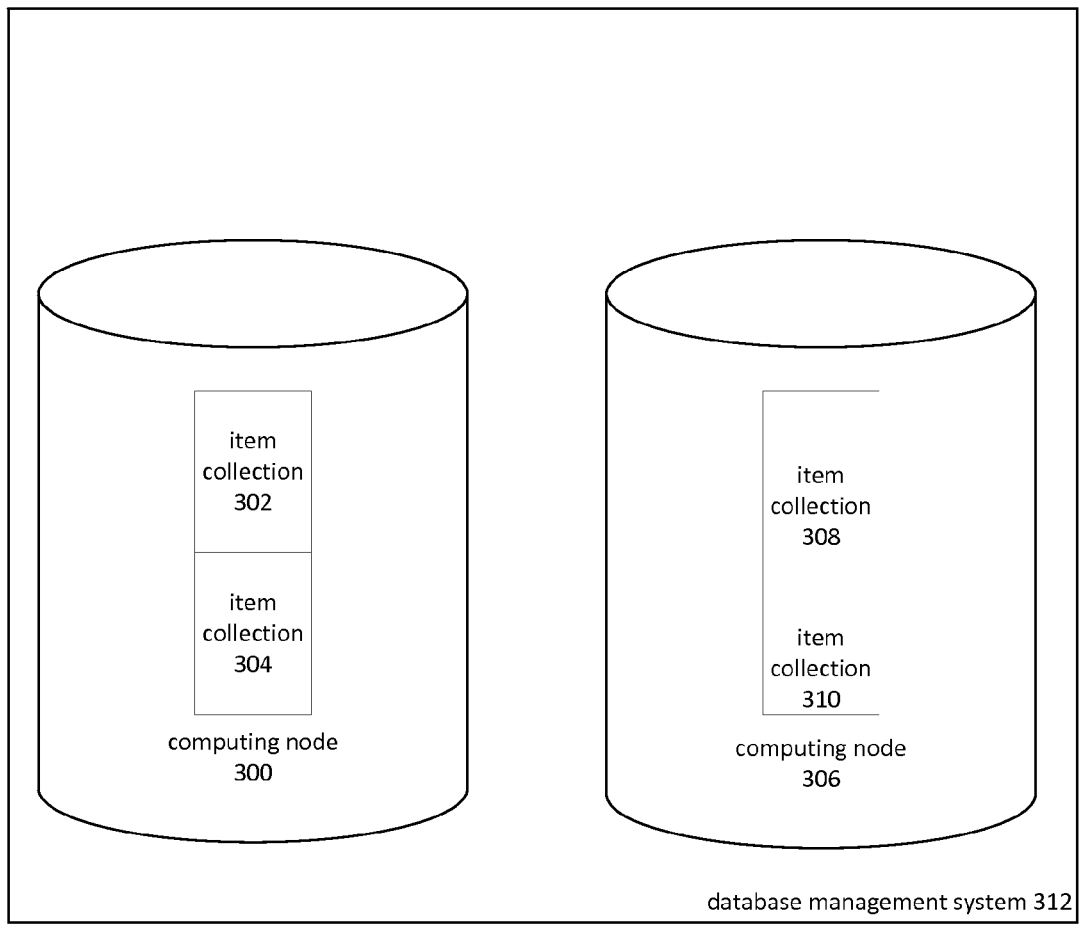
FIG. 3 depicts an embodiment of a database management system evenly distributing local item collections across a plurality of computing nodes.

FIG. 3 depicts an embodiment of a database management system evenly distributing local item collections across a plurality of computing nodes. In the depicted embodiment, database management system 312 comprises two computing nodes 300 and 306. The database management system maintains four item collections. Item collections 302 and 304 may contain, for example, five hundred items each. Item collections 308 and 310 may contain eight hundred items and two hundred items, respectively. Database management system has therefore balanced the distribution of item collections such that each computing node stores approximately the same number of items.

In an embodiment, a database management system may initially assign collections to a computing node based on a bit length or key space size of the second key portion and a utilization factor or utilization rate. In many cases only a small proportion of the available key space is utilized. It may therefore be advantageous to base placement of a collection on factors additional to the theoretical maximum number of items. In an embodiment, a database customer may provide a utilization factor or other information, such as an expected number of items, to the database management system. An expected growth rate may also be utilized to determine an expected size of the collection. The utilization factor or expected size of a collection may also be calculated based on collected statistics. These mechanisms may be employed to estimate the current and future size of a collection and locate the collection accordingly.

It may be advantageous to provide facilities for relocating an item collection. This may be done, for example, when a collection has grown beyond an expected size, resulting in an uneven concentration of items on a particular computing node. Location decisions may also be based in part on an expected rate of growth. This may for example involve moving an item collection from one computing node to another in order to prevent an item collection from running out of room on its current computing node.

In an embodiment, a null first key portion is defined as indicating lack of membership in any local item collection. Items not corresponding to a local item collection may be distributed across all computing nodes evenly, or concentrated on particular computing nodes to compensate for a lack of utilization by items belonging to local item collections. In an embodiment, a null first key portion might be specified to indicate a lack of association with any specific item collection.

Adding a new key-item pair to the distributed database management system may also involve updating a local secondary index. This may be advantageous because in some embodiments there may be a delay in updating the primary index. The secondary index may be updated concurrently or immediately after the new item has been stored. This may have various benefits, including allowing consistent queries after the item has been added but before the primary index has been updated.

Figure 4:
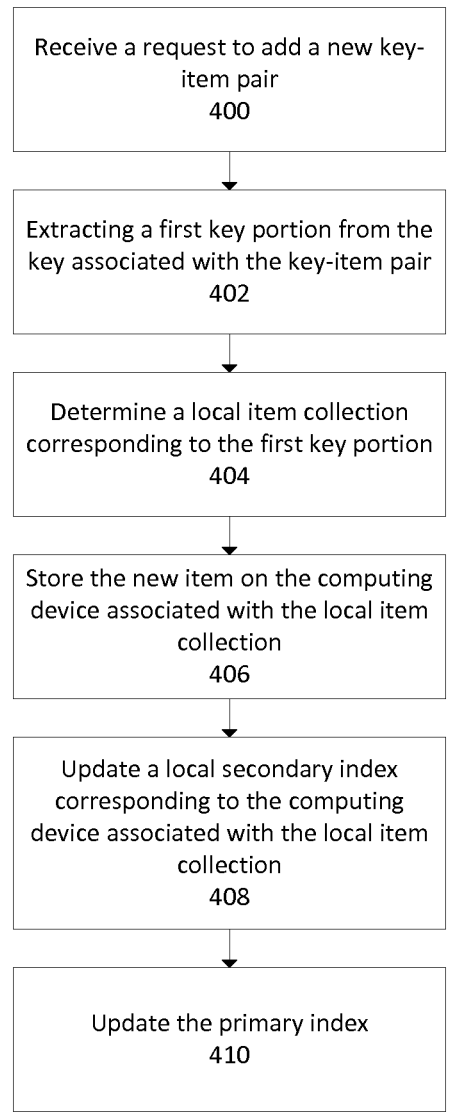
FIG. 4 depicts an embodiment of adding a new key-value pair to a database management system using an apportioned key and a local secondary index.

FIG. 4 depicts an embodiment of a process for adding a new key-item pair to a database management system and updating the local secondary index, using techniques consistent with the present disclosure. Although depicted as a sequence of operations, those of ordinary skill in the art will appreciate that the steps depicted may be altered, omitted or performed in various orders, including concurrently.

At 400, a request is received indicating that a new key-item pair should be added to the database system. The request contains the primary key and the additional values that comprise the remainder of the item. At 402, a first key portion is extracted from the key using a technique consistent with the present disclosure.

At 404, the first key portion is used to determine a corresponding local item collection. The local item collection is a set of items that share a common first key portion and are stored on the same computing node. Various data structures and techniques, such as hash tables, distributed hash tables, linked list and table lookups may be used to map between the first key portion and a local item collection. The determination of a local item collection may comprise determining a corresponding computing node, determining a corresponding local secondary index and so forth. It may be advantageous to use structures and methods allowing for an item collection to be relocated on a different device.

At 406, the new item is stored on the computing node associated with the local item collection, or more specifically on a storage device connected or otherwise accessible from the computing node. In some embodiments, the storage device will be connected only to the computing node associated with the local item collection. In other embodiments, one or more additional computing nodes will share one or more storage devices, such as a storage area network. The storage device may take any number of forms, including one or more solid state drives, hard disk drives, storage area networks and so forth.

At 408, a local secondary index associated with the local item collection may be updated to map between the primary key value and the item stored on the associated computing node. In some embodiments, the local secondary index is maintained by a process or component operating on the associated computing node. In other embodiments, the local secondary index is maintained by a process or component operating on a computing node other than the computing node that is associated with the local item collection. In other words, all local secondary indexes might be maintained by a centralized process running on a common server.

In some embodiments, it may be advantageous for the local secondary index to map the entirety of the primary key to the item. In these cases, the mapping scheme employed should be adapted, through means known to those of ordinary skill in the art, to function well given that the leading portion of the primary key, if occupied by the first key portion, will be the same for every key. In some embodiments, the local secondary index will map from only the second key portion of the primary key to the item.

Updates to the item stored on the computing node and the local secondary index may be made in the context of an atomic transaction. If more than one local secondary index is implicated by the addition or update of an item, changes made to all of the applicable local secondary indexes may be wrapped in a single local transaction. This approach allows the item and the various local secondary indexes to be consistently updated in a single atomic transaction or to all be unaffected should the transaction need to be rolled back.

At 410, the primary index is updated to map from the primary key to the new item. The mapping may be direct or indirect. In an embodiment, the primary index refers to an entry in the local secondary index associated with the local item collection. In other embodiments, the primary index is a distributed hash table or similar structure that can be used to locate the item without the involvement of a local secondary index. Those of ordinary skill in the art will appreciate that many alternative embodiments are possible.

In an embodiment, the update of the primary index may be deferred but nevertheless guaranteed to occur at some later time. Eventually consistent updates such as these may be preferable to immediate updates of the primary index, due to performance concerns. However, queries made using the primary index may be temporarily inconsistent, for example, by not always producing results containing recently inserted items.

Figure 5:
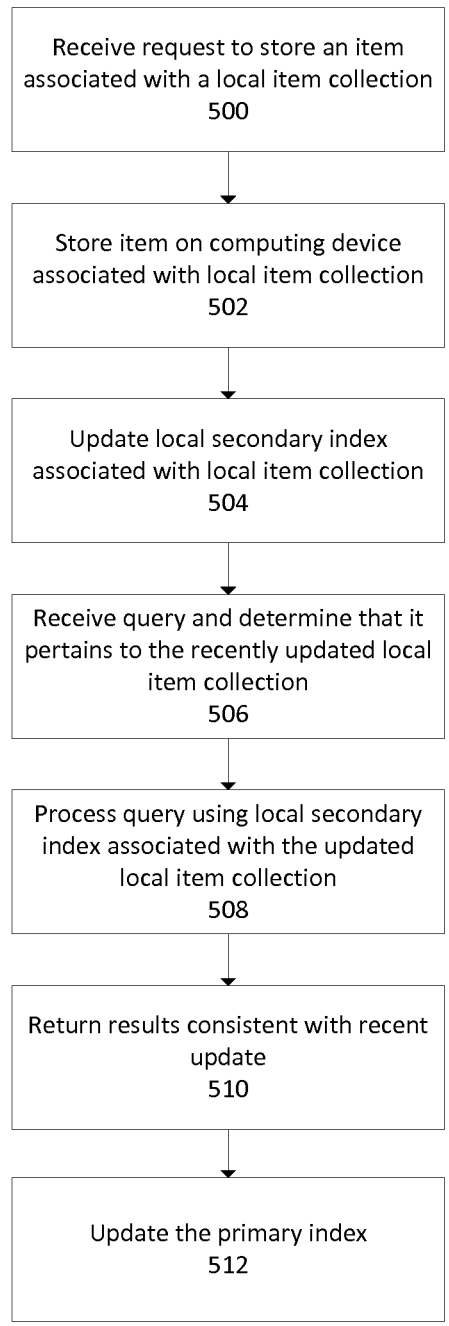
FIG. 5 depicts an embodiment for providing application-consistent updates for items contained in a local item collection.

FIG. 5 depicts an embodiment for providing application consistent updates for items contained in a local item collection. In many instances database management systems are not able to guarantee that queries performed immediately after an update will return information reflecting the update that was just made. This may occur, for example, because updates to the relevant index have been deferred. Because database management systems often do not provide such guarantees, executable code that interacts with the database management system may implement workarounds to the consistency problem. Alternatively, the may fail to work around the problem which may result in latent defects that may be difficult to detect.

By using a first key portion to identify a corresponding local item collection, the database management system may guarantee that subsequent queries or updates to the same local item collection will be immediately consistent, or in other words will reflect the result of previous queries or updates. At operation 500, a request to add or modify an item associated with a local item collection is received. The association between the request and the corresponding local item collection is determined by examining the first key portion and mapping to the relevant collection, using methods and techniques consistent with the present disclosure.

At operation 502, the database management system processes the update by storing the item on the computing node associated with the local item collection. At 504, the local secondary index is updated to reflect the contents of the new item. In general this will involve adding the key value associated with the update to the local secondary index. In some embodiments, local secondary indexes may also be maintained for mappings based on values other than the primary key. Operations 502 and 504 may be performed sequentially or concurrently, and may furthermore be performed as an atomic transaction. An indication of the success of the update is preferably not returned to the client until operations 502 and 504 have been completed.

At 506, a query is received, pertaining to the item just updated in the recent item collection. The query indicates a key value whose first key portion corresponds to the item collection that was modified by the recent update. In some embodiments the database management system may support put and get operations based on a single specified key value. In such cases, the first key portion may be examined to determine the corresponding local item collection and local secondary index. In other embodiments, the query may be examined to determine a key space affected by the query. If that coincides with at least a subset of the key space corresponding to a local item collection, the local secondary index associated with the key space may be utilized to perform an immediately consistent query. At operation 508, the query is processed using an appropriate local secondary index. The results of the query may then be returned, at operation 510, to the client code that initiated the request.

At some later time the primary index may be updated, at operation 512. Because the primary index maps to items stored on all of the computing nodes, it may be disadvantageous to immediately update the primary index. However, application-consistent queries may still be made using the secondary index, which may be updated immediately following or concurrently with the modification.

Figure 6:
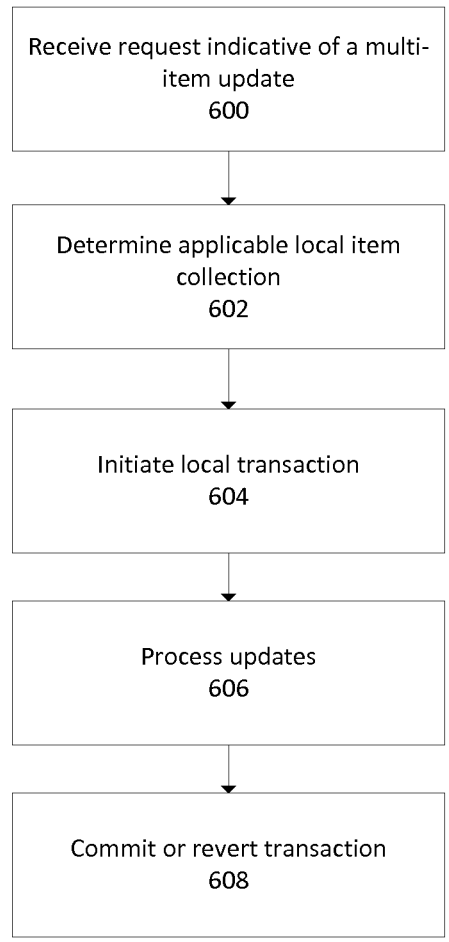
FIG. 6 depicts an embodiment for performing a multi-item update of items contained in a local item collection.

Another application of the techniques described herein is presented in FIG. 6, which depicts an embodiment for performing a multi-item update of items contained in a local item collection. At 600, a request indicative of a multi-item update is received. The request may take a variety of forms, including for example an explicit request to begin a multi-item update, a batch request containing multiple items, a request to initiate a transaction and so forth.

At 602, the recipient of the request determines a local item collection corresponding to the request. For updates specifying a primary key directly, this may be performed by an examination of a first key portion. For more complex query forms, the query may be analyzed to determine the key space affected by the query.

In an embodiment, a request is made to initiate a transaction involving a local item collection corresponding to a first key portion provided in the request. In another embodiment, the first key portion is extracted from one or more requests located in a batch update statement. It may be considered an error to indicate disjoint first key portions. In some embodiments, however, disjoint first key portions may be examined to determine if the correspond to item collections stored on the same computing node.

At 604, a local transaction is initiated on the computing node corresponding to the local item collection. Initiating the local transaction may involve, for example, indicating to a storage module that a local transaction should be started. Embodiments may also involve a transaction token or thread-local storage that is used to indicate the context or scope of the particular local transactions. Each of the multi-item updates is performed within the context or scope created by initiating the local transaction.

At 606, the updates are processed within the scope or context of the local transaction. In other words, the updates are processed as an atomic unit in which all of updates complete successfully or all terminate without modifying the state of the data. The successful completion or termination of all updates is indicated by commit or revert operation 608. A commit indicates that all updates should succeed, while a revert indicates that all updates should be rolled back to their original states.

Figure 7:
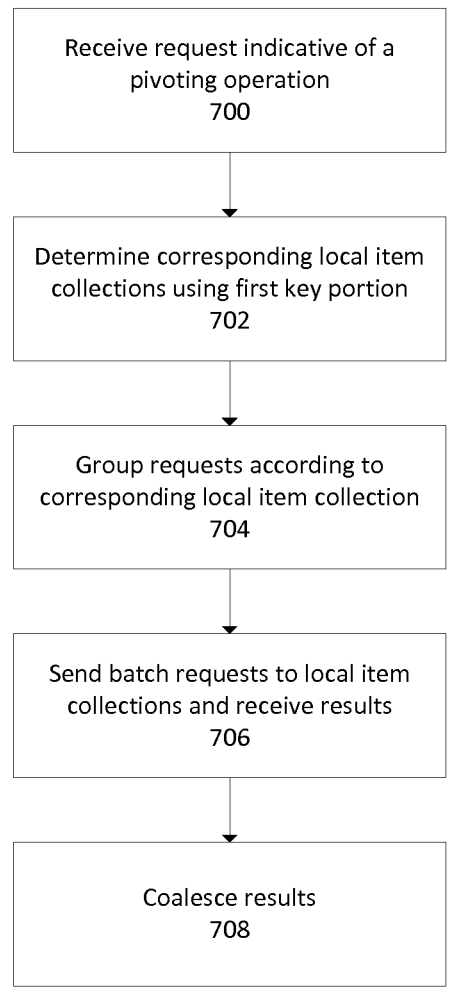
FIG. 7 depicts an embodiment for performing pivoting computations involving a local item collection.

Local item collections may also be applied to operations on related data. FIG. 7 depicts an embodiment for performing pivoting operations involving a local item collection. Pivoting operations involve summarization, aggregation and similar types of operations over a number of items. Generally speaking, pivoting may involve converting columns into rows. These types of operations are useful for a variety of purposes, but may be inefficient when performed on databases structured around key to item pairings, particularly on distributed database management systems. Although it is generally advantageous to distribute items evenly across the computing nodes that comprise the system, the distribution of items makes pivoting operations inefficient because, among other reasons, each computing node in the system may potentially be involved.

Operation 700 depicts receiving a request indicative of a pivoting operation. In a non-limiting example, this may involve an indication of the type of pivoting operation, a list of keys and an indication of which value in each item to use in the pivoting operation. For example, the indication might comprise an indication of a "SUM" pivoting operation, a list of keys and an indication that the "Sales" value in each item should be included in the summarization.

Operation 702 involves determining one or more local item collections that correspond to the key values supplied in the request. This may be done by examining the first key portions of the provided keys and applying techniques and methods consistent with the present disclosure. In some embodiments, all key values must refer to items located in a single local item collection.

In operations 704 and 706, requests pertaining to a single local item collection are grouped together and sent to the computing node corresponding to the local item collection. These steps may be preferable because they reduce the number of network round trips necessary to locate and retrieve the required data. Some embodiments, rather than grouping and batching results, will require that the pivoting operation be performed only on a single item collection. It may then be preferable to route the entire request to the corresponding computing node for processing. This approach may improve performance because it eliminates the need to send large sets of intermediate results. At operation 708, the results are coalesced and returned to the requesting client.

Those of ordinary skill in the art will appreciate that although FIG. 7 is depicted as a sequence of operations, some of the operations may be altered, omitted, modified or performed in varying order, including concurrently.

Each of the processes, methods and algorithms described in the preceding sections may be embodied in, and fully or partially automated by, code modules executed by one or more computing nodes, computers, computing devices or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

A computing node may refer to various types of computing resources, such as personal computers, servers, clustered computing devices and so forth. Non-virtualized computing nodes may be associated with one or more memories configured to store computer-readable instructions, and one or more processors configured to read and execute the instructions. A non-virtualized computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualized computing node may have virtualized access to hardware resources, as well as non-virtualized access. The computing node may be configured to execute an operating system, as well as one or more application programs. In some embodiments, a computing node might also comprise bare-metal application programs.

Client applications and processes may operate on any number and type of computing devices. Non-limiting examples include web servers, application servers, personal computers, gaming consoles, personal digital assistants, mobile phones or any other computing device communicatively connected to other aspects of the present disclosure. Various devices may be communicatively connected through one or more network protocols and associated hardware and software mechanisms, including but not limited to TCP/IP, fiber channel, shared memory, named pipes custom and proprietary protocols. Client applications may also be collocated with other aspects of the present disclosure.

Figure 8:
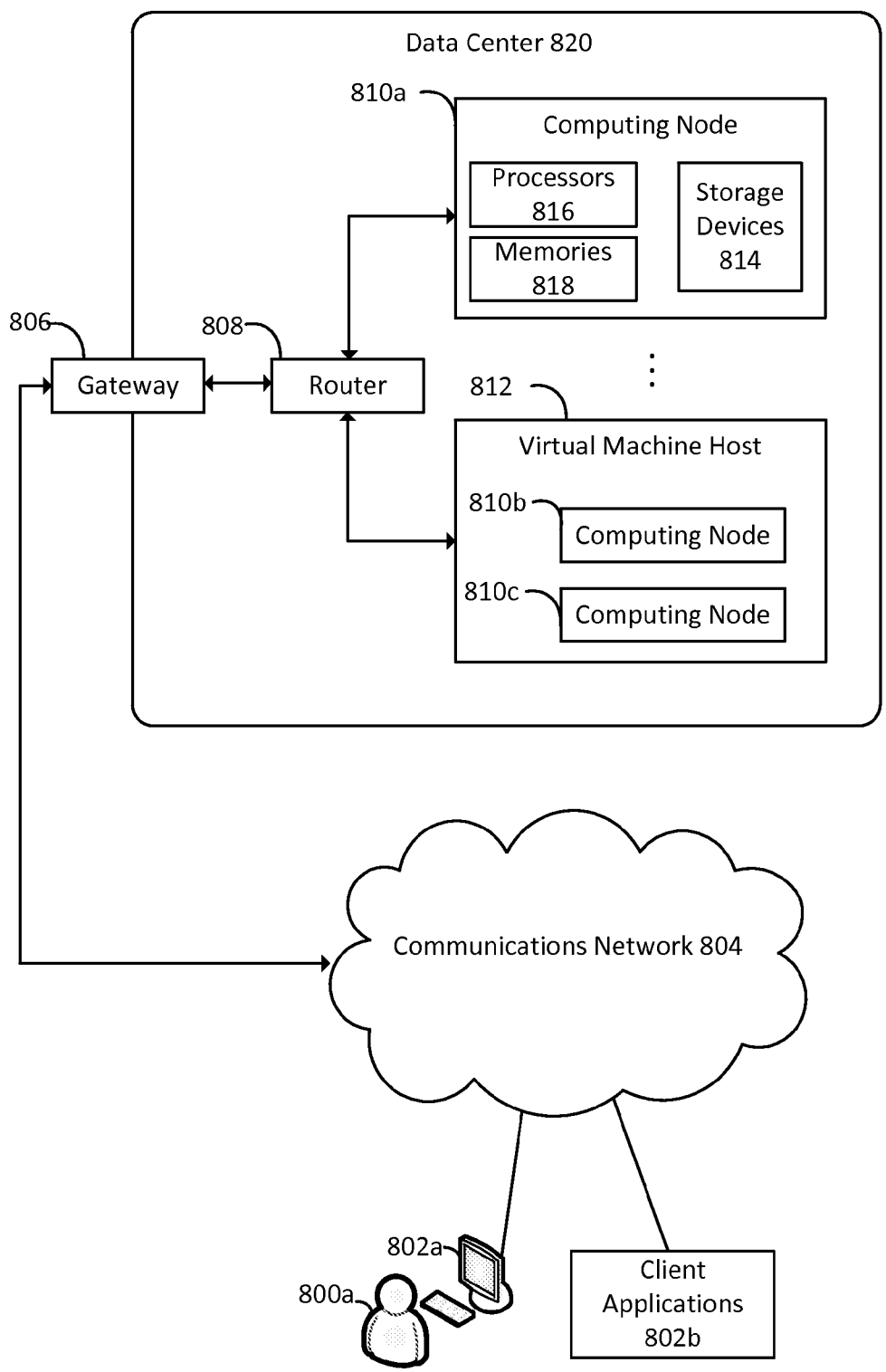
FIG. 8 is a diagram depicting an example of a distributed computing environment on which aspects of the present invention may be practiced.

FIG. 8 is a diagram depicting an example of a distributed computing environment on which aspects of the present invention may be practiced. Various users 800*a* may interact with various client applications, operating on any type of computing device 802*a*, to communicate over communications network 804 with processes executing on various computing nodes 810*a*, 810*b* and 810*c* within a data center 820. Alternatively, client applications 802*b* may communicate without user intervention. Communications network 804 may comprise any combination of communications technology, including the Internet, wired and wireless local area networks, fiber optic networks, satellite communications and so forth. Any number of networking protocols may be employed.

Communication with processes executing on the computing nodes 810*a*, 810*b* and 810*c*, operating within data center 820, may be provided via gateway 806 and router 808. Numerous other network configurations may also be employed. Although not depicted in FIG. 8, various authentication mechanisms, web service layers, business objects or other intermediate layers may be provided to mediate communication with the processes executing on computing nodes 810*a*, 810*b* and 810*c*. Some of these intermediate layers may themselves comprise processes executing on one or more of the computing nodes. Computing nodes 810*a*, 810*b* and 810*c*, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810*a* is depicted as residing on physical hardware comprising one or more processors 816, one or more memories 818 and one or more storage devices 814. Processes on computing node 810*a* may execute in conjunction with an operating system or alternatively may execute as a bare-metal process that directly interacts with physical resources such as processors 816, memories 818 or storage devices 814.

Computing nodes 810*b* and 810*c* are depicted as operating on virtual machine host 812, which may provide shared access to various physical resources such as physical processors, memory and storage devices. Any number of virtualization mechanisms might be employed to host the computing nodes.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for storing and retrieving data in a distributed database management system, the system comprising:
   a first computing node comprising a first one or more storage devices storing a first subset of items from a set of items;
   a second computing node comprising a second one or more storage devices storing a second subset of items from the set of items;
   the distributed database management system configured to maintain a first map in one or more memories, the first map mapping to the set of items stored on the first one or more storage devices and the second one or more storage devices;
   the distributed database management system configured to maintain a second map in one or more memories, the second map mapping to the first subset of items stored on the first one or more storage devices; and
   one or more memories having stored thereon computer-readable instructions that, upon execution, cause the system at least to:
      receive a request to add a first item to the distributed database management system, the request comprising a first primary key and the first item, the first primary key comprising at least two portions including a first key portion and a second key portion;
      determine to store the first item on the first storage device, based at least in part on the first key portion of the first primary key;
      add a first entry to the first map, the first entry mapping between the first primary key and the first item; and
      add a second entry to the second map, the second entry mapping between at least the second key portion and the first item.

2. The system of claim 1, further comprising one or more memories having stored thereon computer-readable instructions that, upon execution, cause the system to at least:
   receive a request to retrieve the first item, the request comprising the first primary key;
   determine to use the second map based at least in part on the first key portion of the first primary key; and
   retrieve the item using the second map and the first primary key.

3. The system of claim 1, further comprising one or more memories having stored thereon computer-readable instructions that, upon execution, cause the system to at least:
   determine that a plurality of requests have primary keys corresponding to the first key portion;
   initiate a transaction context local to the first computing node, the transaction context indicative of a series of operations to be performed as an atomic unit; and
   update data maintained on the first computing node in the context of the transaction.

4. The system of claim 1, further comprising a computing node configured to:
   receive a request to perform a pivoting operation, the request corresponding to a plurality of primary keys corresponding to the first key portion associated with the first computing node; and
   perform the pivoting operation on items corresponding to the plurality of primary keys in the first subset of items.

5. A method for data storage and retrieval in a distributed database management system comprising a first and one or more additional computing nodes, the method comprising:
   associating the first computing node of the distributed database management system with a subset of items based at least in part on a first key portion corresponding to each item in the subset of items;

determining to store a first item on the first computing node, based on the first item corresponding to a first primary key having the first key portion the;

adding to a first map a first entry mapping between the first primary key and the item, wherein the first map comprises entries mapping to items stored on the first computing node and the one or more additional computing nodes; and adding to a second map a second entry mapping from at least a second portion of the first primary key to the item, wherein the second map comprises a mapping for each of the subset of items, the subset of items stored at least on the first computing node.

6. The method of claim 5, further comprising:

in response to a request to read the item, reading the item using the second map.

7. The method of claim 6, wherein the item is read before the first entry is added to the first map.

8. The method of claim 5, further comprising:

in response to receiving two or more requests to update items, each of the requests having a primary key corresponding to the first key portion, updating the items in a transaction context local to the first computing node.

9. The method of claim 5, further comprising:

in response to receiving a request to perform an operation on a set of items, the request corresponding to a plurality of primary keys having a common first key portion associated with the first computing node, performing the operation using the second map.

10. The method of claim 9, wherein the operation is a pivoting operation.

11. The method of claim 5, wherein the first key portion is a leading segment of a binary value.

12. The method of claim 5, wherein the subset of items is a cluster of logically related items.

13. The method of claim 5, wherein the second portion of the first primary key comprises at least a first subdivision and a second subdivision, further comprising:

adding to a third map a third entry mapping from at least the first subdivision to the item, wherein the third map comprises a mapping for each of a subset of the subset of items.

14. A non-transitory computer-readable storage medium having stored thereon instructions that, upon execution by a computing device, cause the computing device to at least:

associate a first computing node with a first key portion of a primary key, the primary key subdivided into at least a first key portion and a second key portion;

in response to a request to store a first item, the request comprising the primary key and the first item, determine to store the first item on the first computing node based at least in part on the first key portion of the primary key;

add a first entry to a first map, the first entry mapping from the primary key to the first item, the first map having entries comprising mappings to items stored on the first computing node and to items stored one at least one additional computing nodes; and add a second entry to a second map, the second entry mapping from at least the second key portion to the first item, the second map comprising entries to a subset of items stored at least on the first computing node, each item in the subset of items corresponding to the first key portion.

15. The computer-readable medium of claim 14, having stored thereon instructions that, upon execution by a computing device, cause the device to at least determine to use the second map based at least in part on the first key portion.

16. The computer-readable medium of claim 14, having stored thereon instructions that, upon execution by a computing device, cause the device at least to retrieve the first item using the second map.

17. The computer-readable medium of claim 14, having stored thereon instructions that, upon execution by a computing device, cause the device to at least:

receive information indicative of a request to update the first item and a second item in an atomic transaction;

determine that the first item and the second item have primary keys corresponding to the first key portion and are in the subset of items stored on the first computing node; and update the first and second item in an atomic transaction on the first computing node.

18. The computer-readable medium of claim 14, having stored thereon instructions that, upon execution by a computing device, cause the device to at least:

receive information indicative of a request to perform an operation involving the first item and a second item;

determine that the first item and the second item have primary keys corresponding to the first key portion and are in the subset of items stored on the first computing node; and performing the operation by at least retrieving the first and second item from the first computing node.

19. The computer-readable medium of claim 14, having stored thereon instructions that, upon execution by a computing device, cause the device to at least:

determine to associate the first key portion of a primary key with the first computing node, based at least in part on one or more of a key space size corresponding to a second key portion of the primary key, an expected key space utilization rate, and an expected growth rate.

20. A system for storing and retrieving data, the system comprising:

a first computing node comprising a first storage device;

a second computing node comprising a second storage device;

the first and second computing nodes configured to maintain a first index of items stored on the first and second storage devices; and one or more memories having stored thereon computer-readable instructions that, upon execution, cause the system to at least:

determine to store an item on the first storage device, the determination based at least in part on an association between a first key portion of a primary key associated with the item and the first computing node;

add a first entry to the first index, the entry referencing the first item based at least in part on the primary key, wherein items in the first index correspond to a plurality of first key portions; and add a second entry to a second index of items stored at least on the first storage device, wherein each item in the second index corresponds to a first key portion of the primary key.

21. The system of claim 20, wherein the first key portion is a fixed-width leading portion of binary data.

22. The system of claim 20, wherein the first storage device comprises one or more solid-state drives.

23. The system of claim 20, one or more memories having stored thereon computer-readable instructions that, upon execution, cause the system to at least:

receive an indication of a division of primary keys into at least first key portions and second key portions; and store information corresponding to the indication in a record accessible to the first and second computing nodes.

24. The system of claim 20, wherein all items having primary keys corresponding to the first key portion are stored on the first computing device.

* * * * *